(12) United States Patent
Zhao et al.

(10) Patent No.: US 9,849,390 B2
(45) Date of Patent: Dec. 26, 2017

(54) RESOURCE MANAGEMENT FOR DISTRIBUTED GAMES

(71) Applicant: Empire Technology Development LLC, Wilmington, DE (US)

(72) Inventors: Ran Zhao, Beijing (CN); Qi Li, Beijing (CN); Xuefeng Song, Hebei (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/367,031

(22) Filed: Dec. 1, 2016

(65) Prior Publication Data
US 2017/0080345 A1  Mar. 23, 2017

Related U.S. Application Data

(62) Division of application No. 14/409,464, filed as application No. PCT/CN2013/073594 on Apr. 2, 2013, now Pat. No. 9,526,992.

(51) Int. Cl.
| A63F 13/77 | (2014.01) |
| A63F 13/795 | (2014.01) |
| A63F 13/358 | (2014.01) |
| A63F 13/352 | (2014.01) |

(52) U.S. Cl.
CPC ............ *A63F 13/77* (2014.09); *A63F 13/352* (2014.09); *A63F 13/358* (2014.09); *A63F 13/795* (2014.09)

(58) Field of Classification Search
CPC ...... A63F 13/77; A63F 13/352; A63F 13/358; A63F 13/795
See application file for complete search history.

(56) References Cited

U.S. PATENT DOCUMENTS 6,671,774 B1 * 12/2003 Lam ..................... G06F 3/0601
                                                                710/104
7,677,979 B2    3/2010 Van Luchene
9,276,894 B2 *  3/2016 Whitnah ................ G06Q 10/10
(Continued)

OTHER PUBLICATIONS

Chisci, L., et al., "An Evolutionary Game Approach to P2P Video Streaming," Global Telecommunications Conference, GLOBECOM 2009, IEEE, pp. 1-5 (Nov. 30, 2009).

(Continued)

*Primary Examiner* — Corbett B Coburn
(74) *Attorney, Agent, or Firm* — Amin, Turocy & Watson, LLP

(57) ABSTRACT

Technologies are generally described for server resource allocation for distributed games. In one example, a method includes allocating a first set of resources for a first player instance on a first server, a second set of resources for a second player instance on the first server, and a third set of resources for a third player instance on a second server. The method also includes comparing a first relationship strength defined between the first player instance and the second player instance with a second relationship strength defined between the first player instance and the third player instance. Further, the method includes distributing at least one of the first set of resources, the second set of resources, or the third set of resources between the first server and the second server based on a result of the comparing.

20 Claims, 10 Drawing Sheets

(56) References Cited

U.S. PATENT DOCUMENTS

| | | | |
|---|---|---|---|
| 2009/0199198 A1 | 8/2009 | Horii et al. | |
| 2011/0212783 A1* | 9/2011 | Dale | H04L 67/1002 463/42 |
| 2013/0275504 A1* | 10/2013 | Patel | G06Q 10/10 709/204 |
| 2014/0228108 A1* | 8/2014 | Bruno, Jr. | G06F 12/00 463/29 |
| 2014/0351343 A1* | 11/2014 | Whitnah | G06Q 10/10 709/204 |

OTHER PUBLICATIONS

International Search Report and Written Opinion for international application No. PCT/CN2013/073594 dated Jan. 9, 2014, 6 pages.
Jordan, H. "Dynamic Load Management for MMOGs in Distributed Environments," Master thesis in computer science, University of Innsbruck, pp. 1-163 (Dec. 9, 2009).
Min, D., et al., "A Load Balancing Algorithm for a Distributed Multimedia Game Server Architecture," Multimedia Computing and Systems, IEEE International Conference on Multimedia Computing and Systems, vol. 2, 7 pages, (Jun. 1999).
Nae, V., et al., "Efficient Management of Data Center Resources for Massively Multiplayer Online Games," Proceeding SC '08 Proceedings of the 2008 ACM/IEEE conference on Supercomputing, Article No. 10, pp. 1-12 (Nov. 2008).
Office Action dated Apr. 12, 2016 for U.S. Appl. No. 14/409,464, 15 pages.

\* cited by examiner

RESOURCE MANAGEMENT FOR DISTRIBUTED GAMES

CROSS-REFERENCE TO RELATED APPLICATIONS

The present application is a divisional application under 35 U.S.C. §120 of U.S. application Ser. No. 14/409,464, filed on Dec. 18, 2014, and entitled "RESOURCE MANAGEMENT FOR DISTRIBUTED GAMES," which is a U.S. National Stage filing under 35 U.S.C. §371 of International Application No. PCT/CN2013/073594, filed on Apr. 2, 2013, and entitled "RESOURCE MANAGEMENT FOR DISTRIBUTED GAMES." The disclosures of U.S. application Ser. No. 14/409,464 and International Application No. PCT/CN2013/073594 are incorporated herein by reference in their entireties.

TECHNICAL FIELD

The subject disclosure relates generally to distributed games and, also generally, to resource management for distributed games.

BACKGROUND

With the advancements in computing technology and the prevalence of computing devices, the usage of computers for daily activities, including gaming activities, has become commonplace. For example, users of computing devices can play interactive, distributed computing games with other users, wherein the users can be located in vastly different locations. As such, the computing devices used by each of the users can be served by different servers and/or data centers. Further, the different servers and/or data centers might not be in direct communication, instead, there might be a number of other servers and/or data centers linking the servers and/or data centers that are supporting the distributed computing game.

The popularization of computing devices has led to the development of resource management systems. For example, some resource management systems measure local workloads and/or focus on modeling a workload on server instances. Such resource management systems allocate the computing and network resources for game program requirements based on load balancing. In another example, resource management systems may force a same server instance to handle players that have an interaction relationship, which can cause player data to be transferred to the same server instance when such interaction relationship is present. However, as discussed above, computing games are distributed and, therefore, a single server instance does not take into consideration the distributed nature of computing games, and, therefore, does not adequately manage the game resources, which can negatively impact the gaming experience.

The above-described deficiencies of conventional approaches to game resource management are merely intended to provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

In one embodiment, a method includes allocating, by a system comprising a processor, a first set of resources for a first player instance on a first server, a second set of resources for a second player instance on the first server, and a third set of resources for a third player instance on a second server. The method also includes comparing a first relationship strength defined between the first player instance and the second player instance with a second relationship strength defined between the first player instance and the third player instance. In addition, the method includes distributing at least one of the first set of resources, the second set of resources, or the third set of resources between the first server and the second server based on a result of the comparing.

According to another embodiment, a system includes a memory storing computer-executable components and a processor, communicatively coupled to the memory. The processor executes or facilitates execution of one or more of the computer-executable components. The computer-executable components include an allocation manager configured to distribute player resources among a plurality of computing devices. The player resources are respectively associated with participants of an interactive computing game. The computer-executable components also include an observation monitor configured to detect a change to a first set of interaction data established between at least two participants of the participants or formation of a second set of interaction data between the at least two participants. Further, the computer-executable components include a relationship supervisor configured to evaluate relationship strengths between subsets of the participants. The relationship strengths are used by the allocation manager to selectively redistribute the player resources based.

According to another embodiment, provided is a computer-readable storage device comprising computer-executable instructions that, in response to execution, cause a system comprising a processor to perform operations. The operations include defining a first mutual value between a first player and a second player. A first instance of the first player and a second instance of the second player are allocated on a first computing device. The operations also include defining a second mutual value between the first player and a third player. A third instance of the third player is allocated on a second computing device. The operations also include comparing the first mutual value and the second mutual value to determine a ranking between the first mutual value and the second mutual value. Further, the operations include at least one of determining that the first instance or the second instance is to be moved from the first computing device to the second computing device, determining that the third instance is to be moved to the first computing device, or determining that the first instance and the second instance are to remain on the first computing device and the third instance is to remain on the second computing device.

In accordance with another embodiment, provided is a system that includes a memory to store instructions and a processor, coupled to the memory, that executes or facilitates execution of the instructions to perform operations. The operations include distributing player resources among a subset of computing devices and evaluating a first relationship strength between a first player and a second player, and a second relationship strength between the first player and a third player. The operations also include reallocating at least a subset of the player resources among the subset of computing devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings in which.

DETAILED DESCRIPTION

Overview

Figure 1:
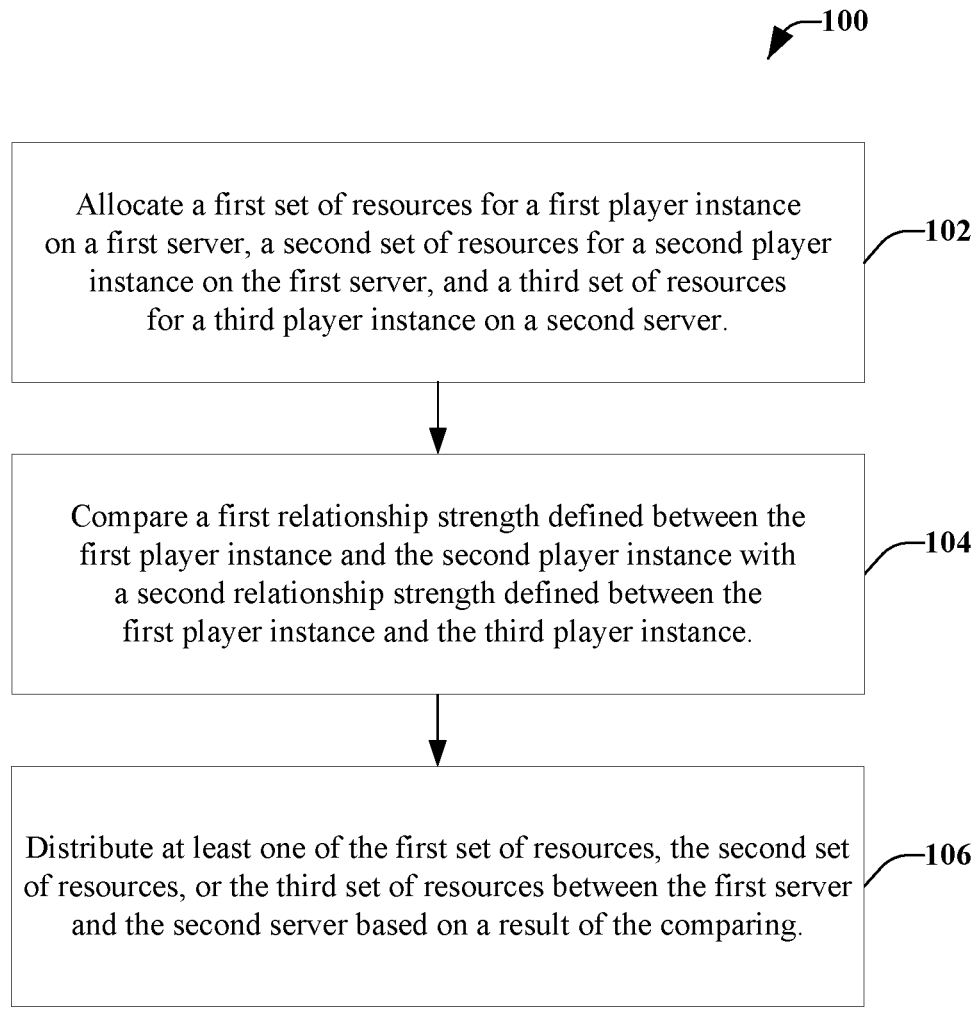
FIG. 1 illustrates an example, non-limiting embodiment of a method for resource management for distributed games.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

Implementation of resource management may be difficult since a game system that is distributed among diverse players does not have completely independent data partition. For example, some resource allocation systems use a massively multiplayer online game (MMOG) workload model that represents the dynamics of both the player population and the player interactions. For example, player interactions may be used to measure local workloads. However, in a distributed cloud game, interactions may exist between pairs of players. Thus, if player interactions are used to measure local workloads, such measurements may not take into account the cost to the local processor or CPU and/or the cost to communications between servers. To overcome this issue, in some embodiments, the disclosed aspects evaluate interactions between servers and/or data centers.

Further, the MMOG workload model focuses on modeling workload of server instances. This model allocates computing and networking resources for game program requirements, which has traditionally been based on load balancing. However, in some embodiments, the disclosed aspects may be configured to reduce inter-server costs by not following the load balancing scenario. For example, if the load has not become the bottleneck, players (e.g., player instances) should be in the same server to avoid inter-server communication.

In another example, some resource allocation systems provide a dynamic load management solution for MMOGs. Such systems treat any interaction as a strong interaction, which forces players that have an interaction relationship to be handled by the same server instance. However, in real games, interactions may not only exist in a nearby area but might also exist across multiple, disparate devices. Thus, in some embodiments, the disclosed aspects may treat interaction as a general interaction, which may exist between pairs of players. Thus, according to various aspects described herein, a condition may be established in which players cannot be divided into independent groups.

Further, according to the above-noted dynamic load management solutions, a player moving to another area may cause player data to be transferred to another server. This occurs even if the player's interaction relationship does not change significantly. The disclosed aspects, in some embodiments, may overcome this issue by using a mutual-value to decide player data ownership.

Some resource allocation systems can create distribution trees for P2P video streaming. For example, each peer continuously measures its own utility (e.g., video, quality) and, by periodical comparison with other randomly chosen peers, tries to mimic the behavior (e.g., resource allocation and video distributors) of peers with higher utility. The disclosed aspects, in some embodiments, may deal with player resource management for distributed games by the reduction of a mutual-value between players on different server instances.

In consideration of the various issues with conventional resource management for distributed games and their limitations, one or more embodiments described herein are directed to a resource management for distributed games. As disclosed herein, resource management for distributed games can be based on a mutual-value between players. For example, some large-scale games may be implemented by adopting distributed servers. Games, thus, may be considered systems in which players interact with each other. These systems cannot be partitioned into several independent parts because a system of game is a whole, in which no absolutely independent data partition exists. Therefore, one aspect disclosed herein is an approach for server resource management that achieves as few inter-server interactions as possible.

One embodiment of resource management for distributed games disclosed herein relates to defining a mutual-value between players. The mutual-value may be dynamically updated during the game process. Based at least in part on the mutual-value, the data of players may be dynamically migrated. For example, based on the data migration, a local optimum may be acquired for the mutual-value between distributed servers. Further, the cost for synchronous communication between servers may be reduced.

In one embodiment, a method is described herein that includes allocating, by a system comprising a processor, a first set of resources for a first player instance on a first server, a second set of resources for a second player instance on the first server, and a third set of resources for a third player instance on a second server. The method also includes comparing a first relationship strength defined between the first player instance and the second player instance with a second relationship strength defined between the first player instance and the third player instance. In addition, the method includes distributing at least one of the first set of resources, the second set of resources, or the third set of resources between the first server and the second server based on a result of the comparing.

According to one example, the method may also include defining the first relationship strength. Further to this aspect, defining the first relationship strength may include quantifying an amount of interaction between the first player instance and the second player instance during a defined time interval to determine an interaction value. The interaction value is stored in a data store.

According to another example, the method may include defining the second relationship strength. Further to this example, defining the second relationship strength may include quantifying a number of times that the first player instance and the third player instance interact during a defined time interval and storing a value representative of the number of times the first player instance and the third player instance interact.

In one example, comparing the first relationship strength with a second relationship strength includes determining that the second relationship strength has a value that is higher than the first relationship strength. Further to this example, the distributing comprises transferring the first set of resources to the second server.

In accordance with another example, comparing the first relationship strength with a second relationship strength includes determining that the first relationship strength has a value that is higher than the second relationship strength. Further to this example, the distributing includes initiating storage of the first set of resources of the first player instance and the second set of resources of the second player instance on the first server and initiating storage of the third set of resources of the third player instance on the second server.

In a further example, defining the first relationship strength includes counting a number of interactions between the first player instance and the second player instance during a specified time interval and determining a weighted sum of the number of interactions as a function of a specified frequency of interactive behavior. Further to this example, the number of interactions may include a number of times the first player instance and the second player instance are displayed on a screen due to a communication from the first player instance to the second player instance or a communication from the second player instance to the first player instance. Alternatively or additionally, the determining may include determining the weighted sum as a further function of a mutual value shared between the first player instance and the second player instance.

In yet another example, the method may include defining the second relationship strength. The defining may include determining an amount of interaction between the first player instance and the third player instance during a specified time interval and determining a weighted sum of the amount of interaction as a function of a specified frequency of interactive behavior.

In still another example, the method may include detecting that interaction data representing interactions between at least two of the first player instance, the second player instance, or the third player instance has changed before the first relationship strength is defined.

According to a further example, the method may include detecting that interaction data representing interactions between at least two of the first player instance, the second player instance, or the third player instance has been generated before the first relationship strength is defined.

In yet another example, the method may include defining a third relationship strength between the first player instance and a fourth player instance, wherein a fourth set of resources of the fourth player instance are located on a third server. Further to this example, the method may include distributing, between the first server, the second server, or the third server, at least one of the first set of resources, the second set of resources, the third set of resources, or the fourth set of resources as a function of the first relationship strength, the second relationship strength, and the third relationship strength.

According to another example, the first relationship strength may define a capability used to process the first player instance and the second player instance on the first server. The second relationship strength may define the capability used to process the first player instance and the third player instance on the second server. In still another example, the method may include preventing transfer of the first player instance, the second player instance, and the third player instance to one of the first server or the second server.

According to another embodiment, a system is described herein that includes a memory storing computer-executable components and a processor, communicatively coupled to the memory. The processor executes or facilitates execution of one or more of the computer-executable components. The computer-executable components include an allocation manager configured to distribute player resources among a plurality of computing devices. The player resources are respectively associated with participants of an interactive computing game. The computer-executable components also include an observation monitor configured to detect a change to a first set of interaction data established between at least two participants of the participants or formation of a second set of interaction data between the at least two participants. Further, the computer-executable components include a relationship supervisor configured to evaluate relationship strengths between subsets of the participants. The relationship strengths are used by the allocation manager to selectively redistribute the player resources.

In one example, the relationship supervisor is further configured to evaluate a first relationship strength defined for a first participant and a second participant, and a second relationship strength defined for the first participant and a third participant. Respective player resources of the second participant and the third participant are distributed among different computing devices of the plurality of computing devices.

In one aspect, first player resources of the first participant and second player resources of the second participant are stored on a first computing device of the plurality of computing devices and third player resources of the third participant are stored on a second computing device of the plurality of computing devices. Further to this aspect, the allocation manager is configured to move the player resources of the first participant from the first computing device to the second computing device in response to a first value of the first relationship strength being determined to be less than a second value of the second relationship strength.

In accordance with another aspect, first player resources of the first participant and second player resources of the second participant are stored on a first computing device of the plurality of computing devices and third player resources of the third participant are stored on a second computing device of the plurality of computing devices. Further to this aspect, the allocation manager is further configured to store the player resources of the first participant on the first computing device in response to a first value of the first relationship strength being determined to be greater than a second value of the second relationship strength.

The relationship supervisor, according to another example, is configured to count a number of interactions between the subsets of the participants and determine a weighted sum of the number of interactions as a function of a predicted frequency of interactions between the subsets of the participants.

In one example, the system includes a resource evaluator configured to monitor a plurality of resources of the player resources allocated to the plurality of computing devices and ascertain whether resources of the player resources of a computing device of the plurality of computing devices satisfy a resource level condition. Further to this example, according to an aspect, the allocation manager may be further configured to move a player resource of the player resources from the computing device to another computing device of the plurality of computing devices in response to the computing device being determined to satisfy the resource level condition. According to another aspect, the allocation manager may be further configured to move a subset of the player resources from the computing device to another computing device of the plurality of computing devices in response to the computing device being determined to satisfy the resource level condition.

According to another embodiment, described herein is a computer-readable storage device comprising computer-executable instructions that, in response to execution, cause a system comprising a processor to perform operations. The operations include defining a first mutual value between a first player and a second player. A first instance of the first player and a second instance of the second player are allocated on a first computing device. The operations also include defining a second mutual value between the first player and a third player. A third instance of the third player is allocated on a second computing device. The operations also include comparing the first mutual value and the second mutual value to determine a ranking between the first mutual value and the second mutual value. Further, the operations include at least one of determining that at least one of the first instance or the second instance is to be moved from the first computing device to the second computing device, determining that the third instance is to be moved to the first computing device, or determining that the first instance and the second instance are to remain on the first computing device and the third instance is to remain on the second computing device.

In one example, the operations may include quantifying interactions between the first player and the second player, and between the first player and the third player. According to another example, determining that at least one of the first instance or the second instance is to be moved from the first computing device to the second computing device may include determining that the first mutual value is lower than the second mutual value.

In another example, the determination that the third instance is to be moved to the first computing device comprises determining that the first mutual value is higher than the second mutual value. In a further example, determining that the first instance and the second instance are to remain on the first computing device and the third instance is to remain on the second computing device comprises determining that the first mutual value is equal to or substantially equal to the second mutual value.

In another example, the operations include monitoring resources allocated on the first computing device and the second computing device and determining a set of the resources on the first computing device satisfy a resource level condition. The operations may also include moving at least one of the set of the resources from the first computing device to the second computing device.

According to yet another example, the operations may include monitoring resources allocated on the first computing device and the second computing device and determining a set of the resources on the second computing device satisfy a resource level condition. The operations may also include moving at least one of the set of the resources from the second computing device to the first computing device.

In accordance with another embodiment, described herein is a system that includes a memory to store instructions and a processor, coupled to the memory, that executes or facilitates execution of the instructions to perform operations. The operations include distributing player resources among a subset of computing devices and evaluating a first relationship strength between a first player and a second player, and a second relationship strength between the first player and a third player. The operations also include reallocating at least a subset of the player resources among the subset of computing devices.

In one example, the operations may include calculating a first set of interactions between the first player and the second player during a defined time interval, and a second set of interactions between the first player and the third player during the defined time interval. The operations may also include comparing the first set of interactions and the second set of interactions.

In another example, the operations may include transferring player resources associated with the first player from a first computing device of the subset of computing devices to another computing device of the subset of computing devices in response to a first value of the first set of interactions being determined to be less than a second value of the second set of interactions.

In still another example, the operations may include transferring player resources associated with the third player from a first computing device of the subset of computing devices to another computing device of the subset of computing devices in response to a first value of the first set of interactions being determined to be more than a second value of the second set of interactions.

The operations may also include, according to another example, monitoring resources allocated among the subset of computing devices. Further, the operations may include determining resources of the player resources on a computing device of the subset of computing devices satisfies a resource level condition, wherein the reallocating comprises moving a player resource of the player resources from a first computing device of the subset of computing devices to another computing device of the subset of computing devices.

Herein, an overview of some of the embodiments for providing resource management for distributed games has been presented above. As a roadmap for what follows next, various example, non-limiting embodiments and features for an implementation of resource management are described in more detail. Then, a non-limiting implementation is given for a computing environment in which such embodiments and/or features may be implemented.

Resource Management for Distributed Games

As disclosed herein, game resources may be dynamically allocated in the process of games and timely responses to changes to the running environments of games is possible. For example, a local optimum may be achieved under a measurement standard based on a mutual-value between players. Relative to some resource allocation systems aimed at load balancing optimization, the disclosed aspects are directed to the features of games. Further, the disclosed aspects are concerned with a load of players' interactions. Such interactions are an important part of games.

With respect to one or more non-limiting ways to manage gaming resources, FIG. 1 illustrates an example, non-limiting embodiment of a method 100 for resource management for distributed games. Method 100 in FIG. 1 may be implemented using, for example, any of the systems, such as a system 200 (of FIG. 2), described herein below. Beginning at block 102, allocate a first set of resources for a first player instance on a first server, a second set of resources for a second player instance on the first server, and a third set of resources for a third player instance on a second server.

For example, the first player instance may be a representation of the first player (e.g., a user of a computing device that is participating in the game). The representation may be in the form of a player name, an avatar, or another manner of identifying the first player and distinguishing the first player from one or more other players. In a similar manner, the second player instance may be a representation of the second player and the third player instance may be a representation of the third player.

The sets of resources (e.g., first set of resources, second set of resources, and third set of resources) may include, but are not limited to, data associated with each respective player. Such data may include identification of the respective player, such as an identification of a user device with which the player is associated, player instance identification, current scores, current game level, historical scores, historical game level, game preferences, and so forth. Block 102 may be followed by block 104.

At block 104, compare a first relationship strength defined between the first player instance and the second player instance with a second relationship strength defined between the first player instance and the third player instance. For example, a strength of a relationship between a first player $p_1$ and a second player $p_2$ may be represented by a mutual value $M(p_1, p_2)$ between the two players. The mutual-value may also represent the degree of requirement for processing the two players in the servers at about the same time. In the process of a game, the number of times of on-the-same-screen talking, fighting, trading, and other forms of interaction between one player and the other players for a certain period of time may be counted and weightedly summed in order to acquire the mutual-values between individual players. This may be expressed as:

$$M(p_1, p_2) = w_i \, m_i(p_1, p_2)$$

where $m_i$ denotes a specific frequency of interactive behavior. In some instances, a player interacts a large percentage of the time with only a small number of other players. Therefore, this data value might be relatively small. Block 104 may be followed by block 106.

At block 106, distribute at least one the first set of resources, the second set of resources, or the third set of resources between the first server and the second server based on the result of the comparing. For example, the third player instance might be moved to the first server. In another example, the first player instance, the second player instance, or both the first player instance and the second player instance might be moved to the second server. In yet another example, there might be no changes to the location of the player instances (e.g., the first player instance and the second player instance remain on the first server and the third player instance remains on the second server).

The resource management approach disclosed herein attempts to reduce the inter-server interactions between players as much as possible. At the beginning of a game, there is an initial allocation of player resources and, after each game-playing time, the interaction data between a player and the other players may be formed or may be changed. At about the same time as the interaction data is formed and/or changed, the allocation of the player resources may be examined and updated.

For example, a determination may be made that the sum of a mutual-value between player $p_0$ (on one server) and at least one other player on another server $S_j$ is greater than a sum of a mutual-value between player $p_0$ and the other players on the current server (e.g., on the one server), namely, $$\Sigma_{p \in S_j} M(p_0, p) > \Sigma_{p \in S_i \& p \neq p_0} M(p_0, p)$$

In this case, this player $p_o$ may be migrated to server $S_j$ (e.g., to reduce the number of inter-server interactions). In this update process, the change in the total inter-server interactions may be:

$$\Delta = \Sigma_{p \in S_j \& p \neq p_0} M(p_0, p) - \Sigma_{p \in S_j} M(p_0, p) < 0$$

which decreases. Therefore, the updating process may continuously change toward a locally optimal, or near optimal, allocation.

Distributed game architectures may bring about large-scale game products that may benefit from resource distribution. The disclosed aspects provide for distributed games in an approach to reduce synchronization and communication between players. The cost of servers may be reduced with the disclosed aspects. Further, the response rates of game servers may be increased through utilization of the disclosed aspects. Therefore, user experiences of games may be improved in a positive manner.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
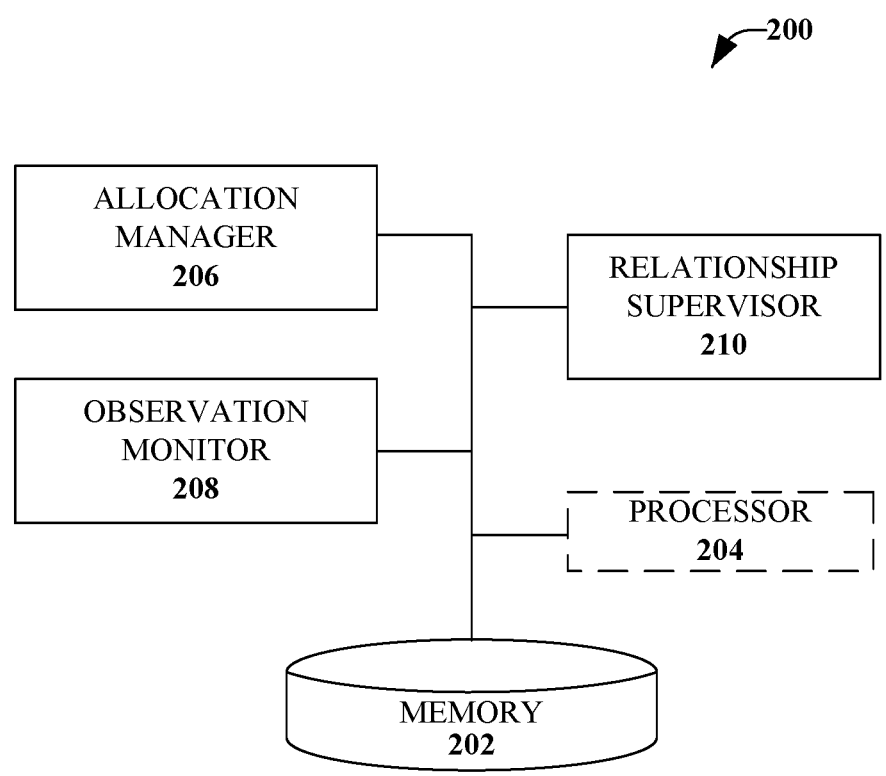
FIG. 2 illustrates an example, non-limiting embodiment of a system for resource management for distributed games.

FIG. 2 illustrates an example, non-limiting embodiment of the system 200 for resource management for distributed games. System 200 may be configured to dynamically allocate game resources during the game process. Further, the system 200 may be configured to timely respond to changes of the running environments of the games. For example, in server resources, at least a portion of game resources are the players, which may include data related to each player and/or each player's instance. The data related to each player may be retained in a database and each player's instance may be retained in memory, for example. Thus, resources of one player may be placed on a first server while resources of other players are placed on the first server or on a second (or a subsequent) server. Therefore, a distributed configuration of resources may be implemented. System 200 may take into consideration the distribution of resources during resource management based in part on a calculation of a mutual-value between players and a dynamic update of player distribution.

For example, a local optimum, or best possible option, may be achieved under a measurement standard based on a mutual-value. Relative to resource allocation systems that are aimed at load balancing optimization, the disclosed aspects are directed to the features of games and are concerned with a load of the players' interactions.

System 200 may include at least one memory 202 that may store computer-executable components and instructions. The system 200 may also include at least one processor 204, communicatively coupled to the at least one memory 202. Coupling may include various communications including, but not limited to, direct communications, indirect communications, wired communications, and/or wireless communications. The at least one processor 204 may facilitate execution of one or more of the computer-executable components stored in the memory 202. The processor 204 may be directly involved in the execution of the computer-executable component(s), according to an aspect. Additionally or alternatively, the processor 204 may be indirectly involved in the execution of the computer executable component(s). For example, the processor 204 may direct one or more components to perform the operations.

It is noted that although one or more computer-executable components may be described herein and illustrated as components separate from memory 202 (e.g., operatively connected to memory), in accordance with various embodiments, the one or more computer-executable components might be stored in the memory 202. Further, while various components have been illustrated as separate components, it will be appreciated that multiple components may be implemented as a single component, or a single component may be implemented as multiple components, without departing from example embodiments.

An allocation manager 206 may be configured to distribute player resources among a plurality of computing devices. The player resources may be respectively associated with participants of an interactive computing game. For example, the participants may be represented by respective user devices (e.g., mobile phone, personal computer, and other devices). In some aspects, each game has two or more players (e.g., participants). Thus, a first player resource may be associated with a first participant, a second player resource may be associated with a second participant, a third player resource may be associated with a third participant, and so on.

An observation monitor 208 may be configured to detect a change to a first set of interaction data. The first set of interaction data may be established between at least two participants. Further, the observation monitor 208 may be configured to detect a formation of a second set of interaction data, which may be formed between the at least two participants or between one of the two participates and another participant.

Further, a relationship supervisor 210 may be configured to evaluate relationship strengths between subsets of the participants and the allocation manager 206 may be configured to selectively redistribute the player resources based on the relationship strengths. For example, the relationship supervisor 210 may be configured to define a capability used to process the first player instance and the second player instance on the first server (e.g., the first relationship strength). The relationship supervisor 210 may also be configured to define the capability used to process the first player instance and the third player instance on the second server (e.g., the second relationship strength). Further, the relationship supervisor 210 may be configured to define the capability used to process one or more other combinations of player instances.

Figure 3:
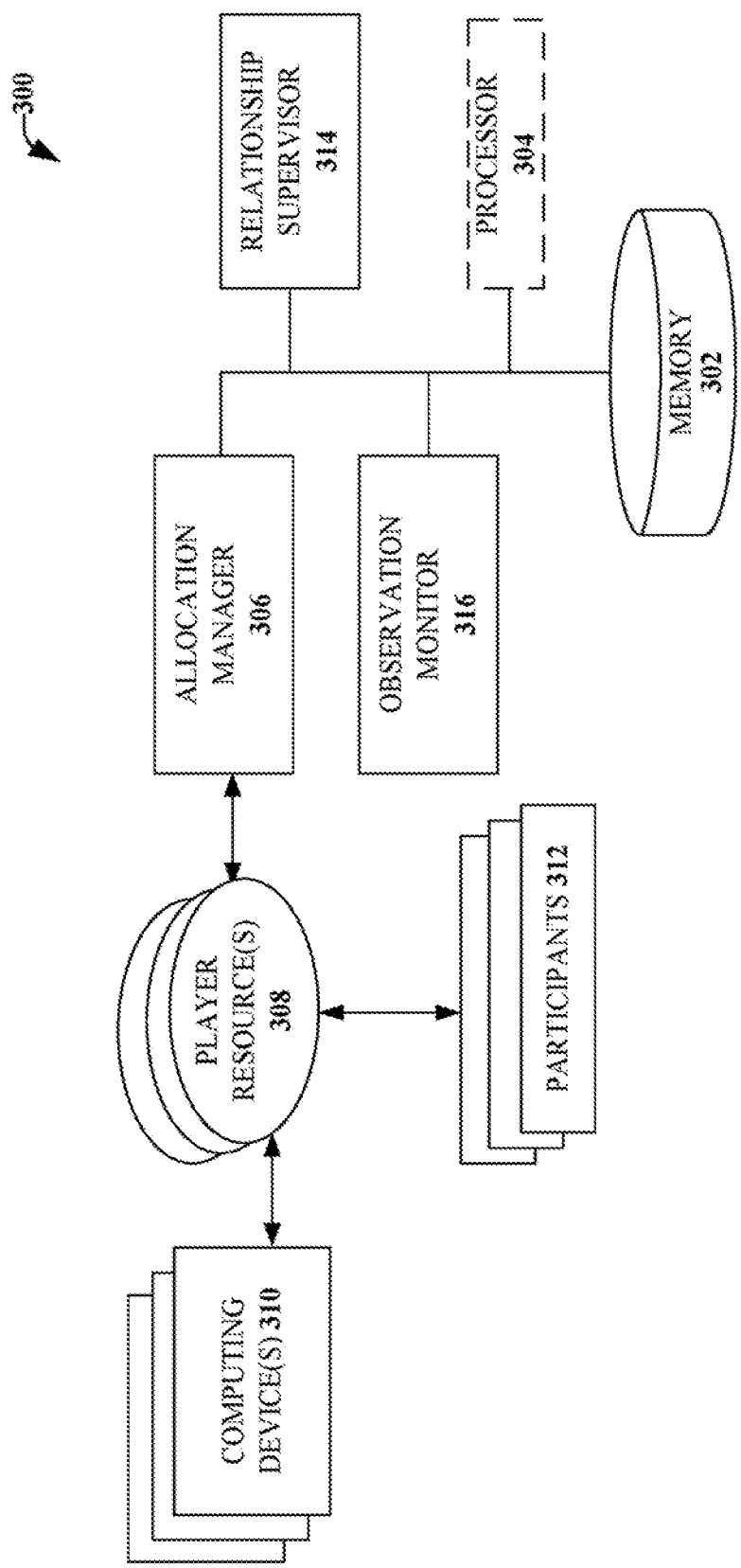
FIG. 3 illustrates an example, non-limiting embodiment of a system configured to selectively redistribute player resources.

FIG. 3 illustrates an example, non-limiting embodiment of a system 300 configured to selectively redistribute player resources. System 300 may include at least one memory 302 that may store computer-executable components and instructions. The system 300 may also include at least one processor 304, communicatively coupled to the at least one memory 302. The at least one processor 304 may facilitate execution of one or more of the computer-executable components stored in the memory 302.

As illustrated, an allocation manager 306 may be configured to distribute player resources 308 among a plurality of computing devices 310. The player resources 308 may be associated with participants 312 of an interactive computing game. For example, a first player resource of the player resources 308 may be associated with a first participant of the participants 312 and a second player resource of the player resources 308 may be associated with a second participant of the participants 312. However, the disclosed aspects are not limited to a single player resource being associated with a single participant. For example, a participant (e.g., first participant) may be associated with two or more resources of the player resources 308. Further, the number of player resources associated with each participant may be different. For example, a first participant might be associated with two player resources, a second participant might be associated with one player resource, a third participant might be associated with four player resources, and so on.

The allocation manager 306 may be configured to initially distribute the player resources 308 among the plurality of computing devices 310. Continuing the above example, the two player resources associated with the first participant might be placed, by the allocation manager 306, on a first computing device of the plurality of computing devices 310. Further, the allocation manager 306 might place the one player resource associated with the second participant on the first computing device (or on a different computing device). The allocation manager 306 might also place the four player resources associated with the third participant on a second computing device of the plurality of computing devices 310. However, the disclosed aspects are not limited to this example, instead, the allocation manager 306 might place resources associated with a single participant (e.g., first participant, second participant, third participant, and so forth) on different computing devices. For example, the player resources of the first participant might be placed on two computing devices (e.g., a first player resource placed on one computing device and the second player resource placed on another computing device). Further, the allocation manager 306 might distribute the player resources 308 among the computing devices 310 in a manner that is different from the manner discussed herein.

The allocation manager 306 may also be configured to selectively redistribute one or more of the player resources 308 based on relationship strengths between subsets of the participants 312. The relationship strengths may be evaluated by a relationship supervisor 314, wherein the evaluation is triggered when the observation monitor 316 detects a change to an interaction between two or more participants and/or formation of an interaction between two or more participants.

According to an implementation, the relationship supervisor 314 may be configured to evaluate a first relationship strength defined for the first participant and the second participant. The relationship supervisor 314 may also be configured to evaluate a second relationship strength defined for the first participant and a third participant. Based in part on the evaluation by the relationship supervisor 314, the allocation manager 306 may be configured to distribute respective player resources of the second participant and the third participant among different computing devices of the plurality of computing devices 310.

For example, first player resources of the first participant and second player resources of the second participant may be stored on a first computing device. Further, third player resources of the third participant may be stored on the second computing device. Further to this example, the relationship supervisor 314 may determine that a first value of the first relationship strength is less than a second value of the second relationship strength. Therefore, according to this example, the allocation manager 306 may be configured to move the player resources of the first participant from the first computing device to the second computing device.

According to another example, first player resources of the first participant and second player resources of the second participant may be stored on the first computing device and third player resources of the third participant may be stored on the second computing device. Further to this example, the relationship supervisor 314 may determine that the first value of the first relationship strength is greater than the second value of the second relationship strength. Therefore, the allocation manager 306 may be configured to store the player resources of the first participant on the first computing device.

In an implementation, the relationship supervisor 314 may be configured to count a number of interactions between the subsets of the participants and determine a weighted sum of the number of interactions as a function of the predicted frequency of interactions between the subsets of the participants. As a function of the weighted sum, the player resources may be distributed between computing devices. For example, the weighted sum indicates the first participant and the third participant interact more often than the first participant and the second participant interact. Further to this example, the player resources of the first participant and the player resources of the third participant may be moved to a same computing device.

Figure 4:
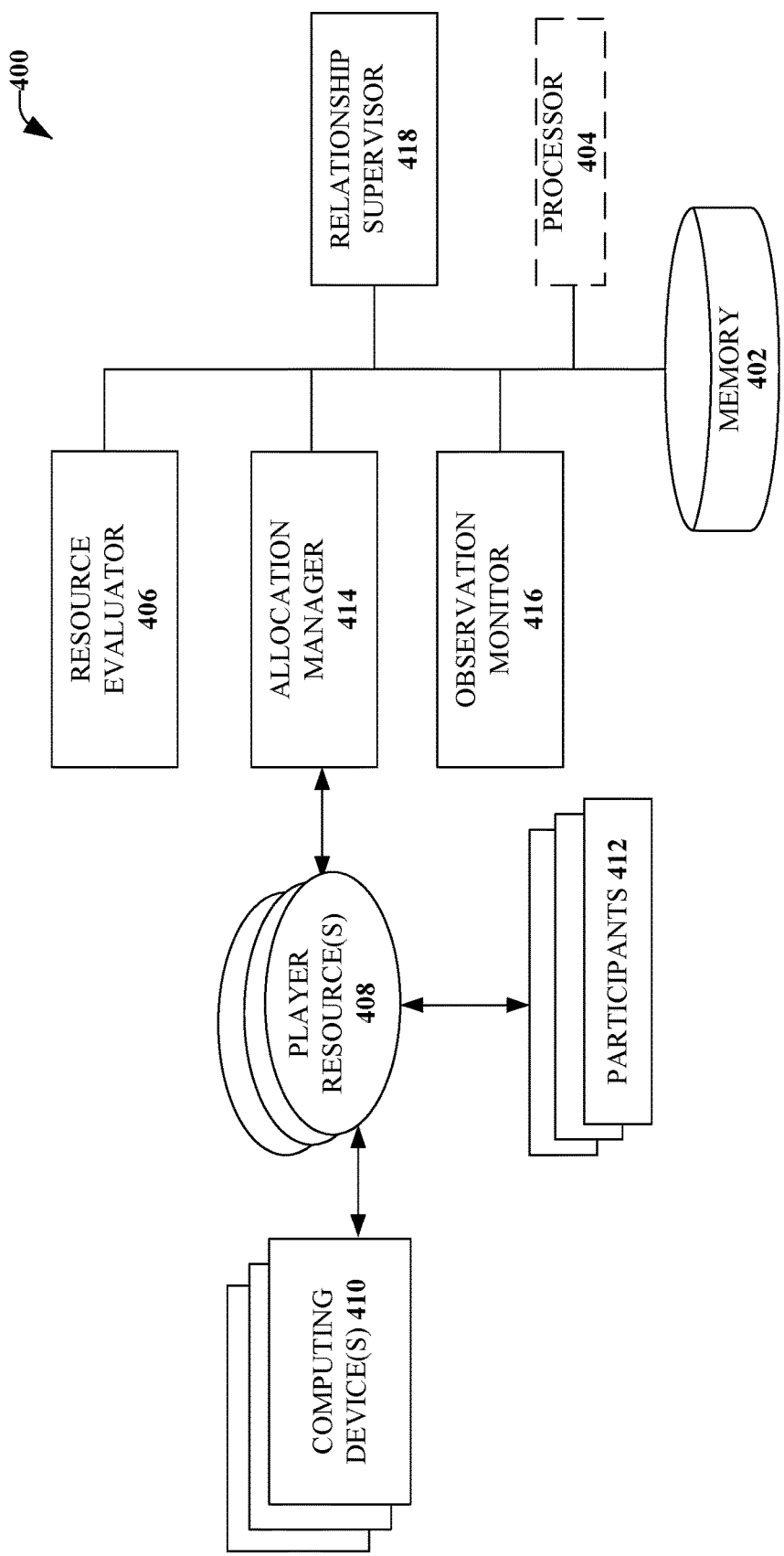
FIG. 4 illustrates an example, non-limiting embodiment of a system for monitoring resources and dynamically managing the resources.

FIG. 4 illustrates an example, non-limiting embodiment of a system 400 for monitoring resources and dynamically managing the resources. System 400 may include at least one memory 402 and at least one processor 404, communicatively coupled to the at least one memory 402. The memory 402 may store computer-executable components and instructions. The at least one processor 404 may facilitate execution of one or more of the computer-executable components stored in the memory 402.

Also included in system 400 may be a resource evaluator 406 that may be configured to monitor a plurality of resources of player resources 408 allocated to a plurality of computing devices 410. The player resources 408 may be associated with participants 412 of an interactive computing game. The resource evaluator 406 may ascertain whether resources of a computing device satisfy a resource level condition. According to an implementation, when the resource evaluator 406 determines that the resource level condition is satisfied, an allocation manager 414 may be configured to move a player resource from a computing device, on which the player resource is currently stored, to another computing device.

In an alternative implementation, when the resource evaluator 406 determines that the resource level condition is satisfied, the allocation manager 414 may be configured to move a subset of player resources from the computing device to another computing device. For example, in distributed servers, there may be an upper limit for resources. When a situation is encountered where the target server has reached its upper limit during the migration of players' data, all players of the target machine may be examined. The increment of mutual-value between servers produced after each player is migrated from this server may be calculated. Several players whose increments are the least may be migrated out of this server. In this situation, a group of players, instead of only one player, may be chosen for migration, which may reduce the frequency of occurrence of this situation.

In an implementation, an observation monitor 416 may be configured to detect a change to an interaction between two or more participants and/or formation of an interaction between two or more participants. A relationship supervisor 418 may be notified, by the observation monitor 416, of the detected change and/or the detected interaction formation. The relationship supervisor 418 may be configured to evaluate relationship strengths between pairs of participants 412. Further, the allocation manager 414 may redistribute one or more player resources 408 based on the relationship strengths as evaluated by the relationship supervisor 418.

Figure 5:
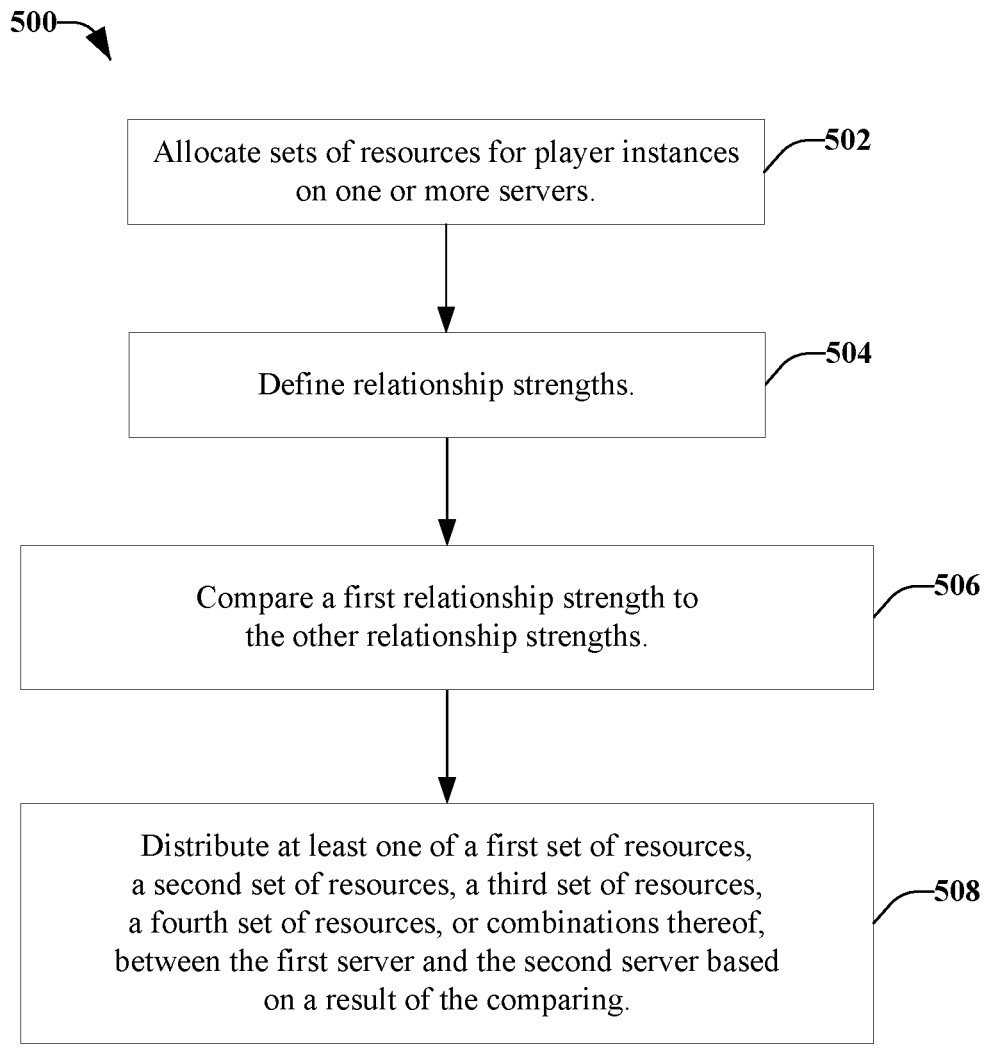
FIG. 5 is a flow diagram illustrating an example, non-limiting embodiment of a method for defining relationship strengths during resource management.

FIG. 5 is a flow diagram illustrating an example, non-limiting embodiment of a method 500 for defining relationship strengths for resource management. The flow diagram in FIG. 5 may be implemented using, for example, any of the systems, such as the system 400 (of FIG. 4), described herein.

Beginning at block 502, allocate sets of resources for player instances on one or more servers. The sets of resources may include a first set of resources, a second set of resources, a third set of resources, or other sets of resources. The sets of resources may include, but are not limited to, data associated with each player. The data may include identification of the player, such as an identification of a user device with which the player is associated, player instance identification, current scores, current game level, historical scores, historical game level, game preferences, and other means of identifying and/or distinguishing between the players. Block 502 may be followed by block 504.

At block 504, define relationship strengths. For example, a first relationship strength may be defined between the first player instance and the second player instance. Further, a second relationship strength may be defined between the first player instance and a third player instance. According to an implementation, a third (or subsequent) relationship strength may be defined between the first player instance and a fourth player instance, and so forth for additional player instances. In an example, a fourth set of resources of the fourth player instance may be located on a third server. Block 504 may be followed by block 506.

At block 506, compare a first relationship strength to the other relationship strengths. For example, the first relationship strength may be compared to a second relationship strength, a third relationship strength, and subsequent relationship strengths. The comparison is made to determine whether resources should be moved between servers. Block 506 may be followed by block 508.

At block 508, distribute at least one of a first set of resources, a second set of resources, a third set of resources, a fourth set of resources, or combinations thereof, between a first server and a second server based on a result of the comparing. For example, the player resources might be allocated on a single server or might be distributed among two or more servers as discussed herein.

Figure 6:
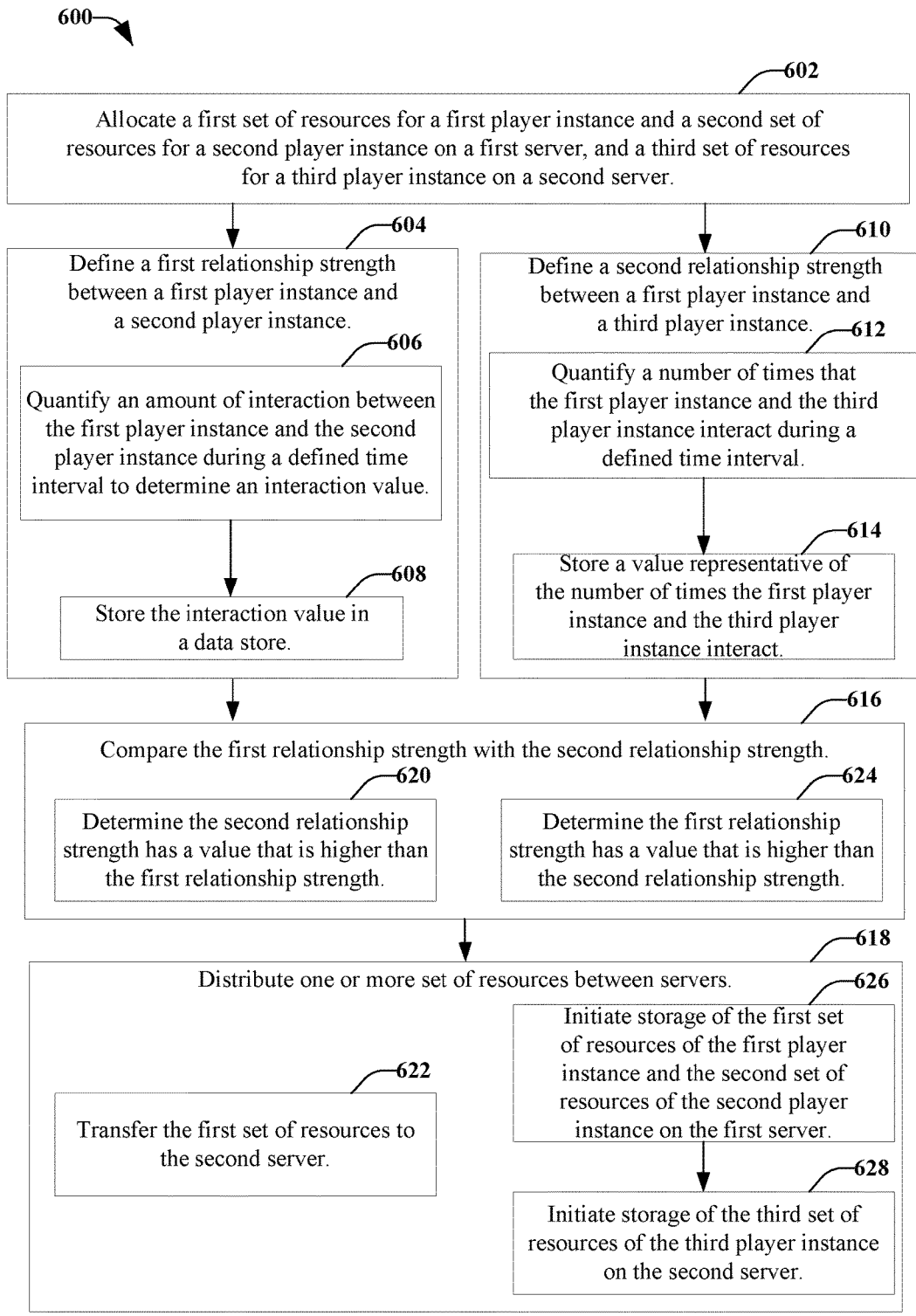
FIG. 6 is a flow diagram illustrating an example, non-limiting embodiment of a method for resource management.

FIG. 6 is a flow diagram illustrating an example, non-limiting embodiment of a method 600 for resource management. The flow diagram in FIG. 6 may be implemented using, for example, any of the systems, such as the system 300 (of FIG. 3), described herein.

Beginning at block 602, allocate a first set of resources for a first player instance and a second set of resources for a second player instance on a first server, and a third set of resources for a third player instance on a second server. Subsequent sets of resources may be allocated on the first server, the second server, or on one or more other servers. Further, it should be understood that the distribution of the sets of resources may be different from the distribution described herein. For example, the first set of resources might be allocated on the first server and the second and third sets of resources may be allocated on the second server. In another example, the first and third sets of resources might be allocated on the second server and the second set of resources might be allocated on the first server. Block 602 may be followed by block 604 and/or block 610.

At block 604, define a first relationship strength between a first player instance and a second player instance. Block 604 may include block 606 and block 608. In an implementation, at block 606, quantify an amount of interaction between the first player instance and the second player instance during a defined time interval to determine an interaction value. In an example, the amount of interaction may be quantified during a defined time interval. Block 606 may be followed by block 608. At block 608, store the interaction value in a data store (e.g., memory 302 of FIG. 3).

In an alternative implementation, block 602 may be followed by block 610. At block 610, define a second relationship strength between the first player instance and the third player instance. Block 610 may include block 612 and block 614. In an implementation, at block 612, quantify a number of times that the first player instance and the third player instance interact during a defined time interval. In an example, the defined time interval may be the same time interval during which the first relationship strength is defined. Block 612 may be followed by block 614. At block 614, store a value representative of the number of times the first player instance and the third player instance interact. In an implementation, the value may be stored in the data store (e.g., in memory 302 of FIG. 3).

In a similar manner, subsequent relationship strengths may be defined. For example, a number of times the first player instance interacts with a fourth (or subsequent) player instance may be quantified. The subsequent relationship strengths may also be stored in the data store.

According to an implementation, the first relationship strength may define a capability used to process the first player instance and the second player instance on the first server. Further to this implementation, the second relationship strength may define the capability used to process the first player instance and the third player instance on the second server.

Block 604 and/or block 610 may be followed by block 616. At block 616, compare the first relationship strength with the second relationship strength. Block 616 may be followed by block 618. At block 618, distribute one or more set of resources between servers.

In an implementation, the comparison, at block 616 may include block 620. At block 620, determine the second relationship strength has a value that is higher than the first relationship strength. Further to this implementation, the distribution, at block 618 includes block 622. At block 622, transfer the first set of resources to the second server.

According to another implementation, the comparison, at block 616, includes block 624. At block 624, determine the first relationship strength has a value that is higher than the second relationship strength. Further to this implementation, the distribution, at 618 includes block 626 and block 628. At block 626, initiate storage of the first set of resources of the first player instance and the second set of resources of the second player instance on the first server. Block 626 may be followed by block 628. At block 628, initiate storage of the third set of resources of the third player instance on the second server.

Figure 7:
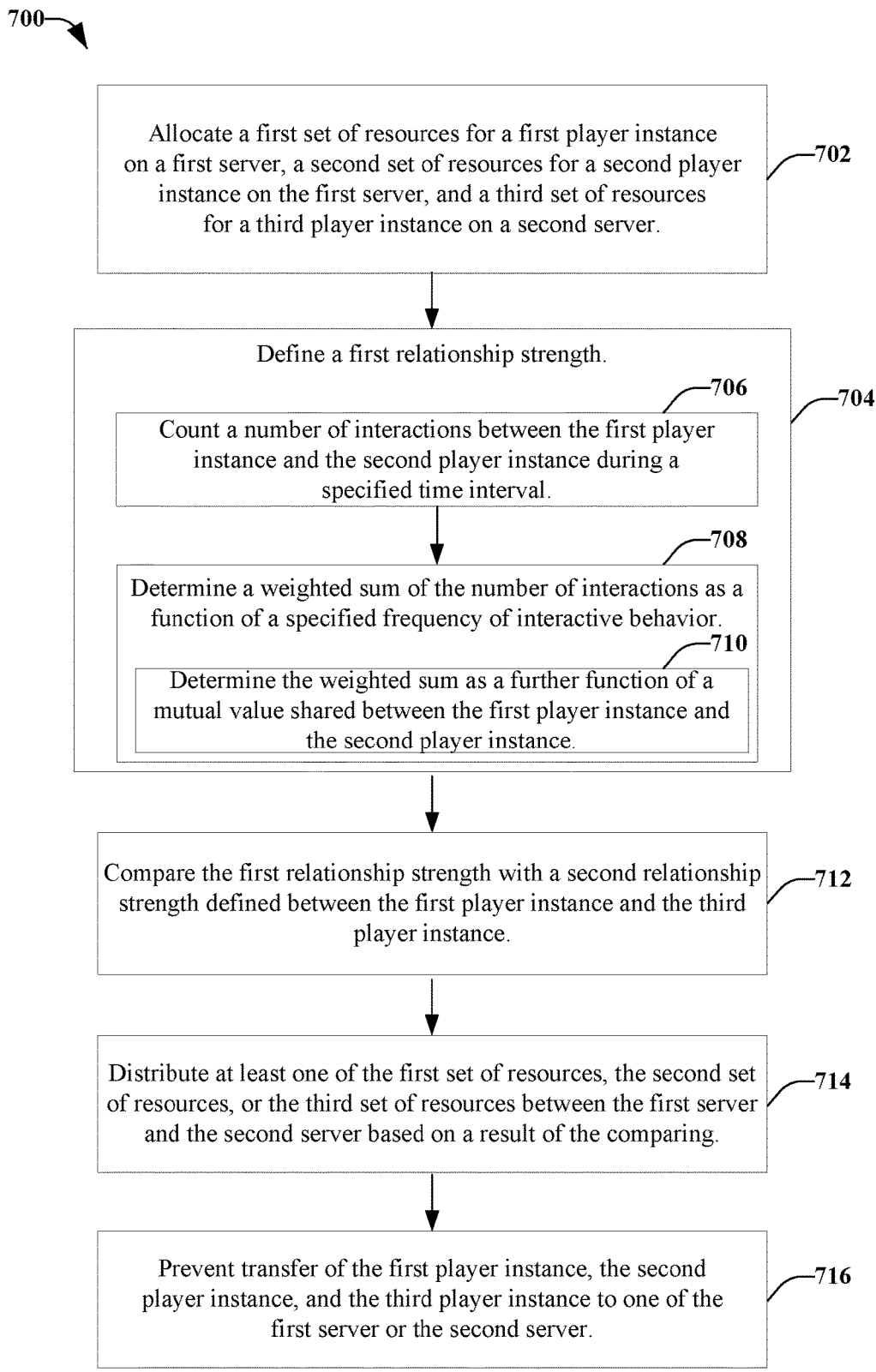
FIG. 7 is a flow diagram illustrating an example, non-limiting embodiment of a method for defining relationship strengths for resource management.

FIG. 7 is a flow diagram illustrating an example, non-limiting embodiment of a method 700 for defining relationship strengths for resource management. The flow diagram in FIG. 7 may be implemented using, for example, any of the systems, such as the system 300 (of FIG. 3), described herein.

Beginning at block 702, allocate a first set of resources for a first player instance on a first server, a second set of resources for a second player instance on the first server, and a third set of resources for a third player instance on a second server. According to various implementations, the player resources may be allocated differently than described. For example, the first set of resources might be allocated on a first server, the second set of resources might be allocated on a second server, and a third set of resources might be allocated on a third server. Block 702 may be followed by block 704.

At block 704, define a first relationship strength. According to an implementation, block 704 may include block 706 and block 708. At block 706, count a number of interactions between the first player instance and the second player instance during a specified time interval. Further to this implementation, block 706 may be followed by block 708. At block 708, determine a weighted sum of the number of interactions as a function of a specified frequency of interactive behavior.

In an example, the number of interactions may include a number of times the first player instance and the second player instance are displayed on a screen due to a communication from the first player instance to the second player instance or a communication from the second player instance to the first player instance. Communication in this context may refer to voice communications, machine language communication (including text or other data), player contact, or other interactions between players that occur during the course of the game activity.

According to another implementation, the determination, at block 708, may include block 710. At block 710, determine the weighted sum as a further function of a mutual value shared between the first player instance and the second player instance.

Block 704 may be followed by block 712. At block 712, compare the first relationship strength with a second relationship strength defined between the first player instance and the third player instance. Block 712 may be followed by block 714. At block 714, distribute at least one of the first set of resources, the second set of resources, or the third set of resources between the first server and the second server based on a result of the comparing.

According to an implementation, block 714 may be followed by block 716. At block 716, prevent transfer of the first player instance, the second player instance, and the third player instance to one of the first server or the second server.

Figure 8:
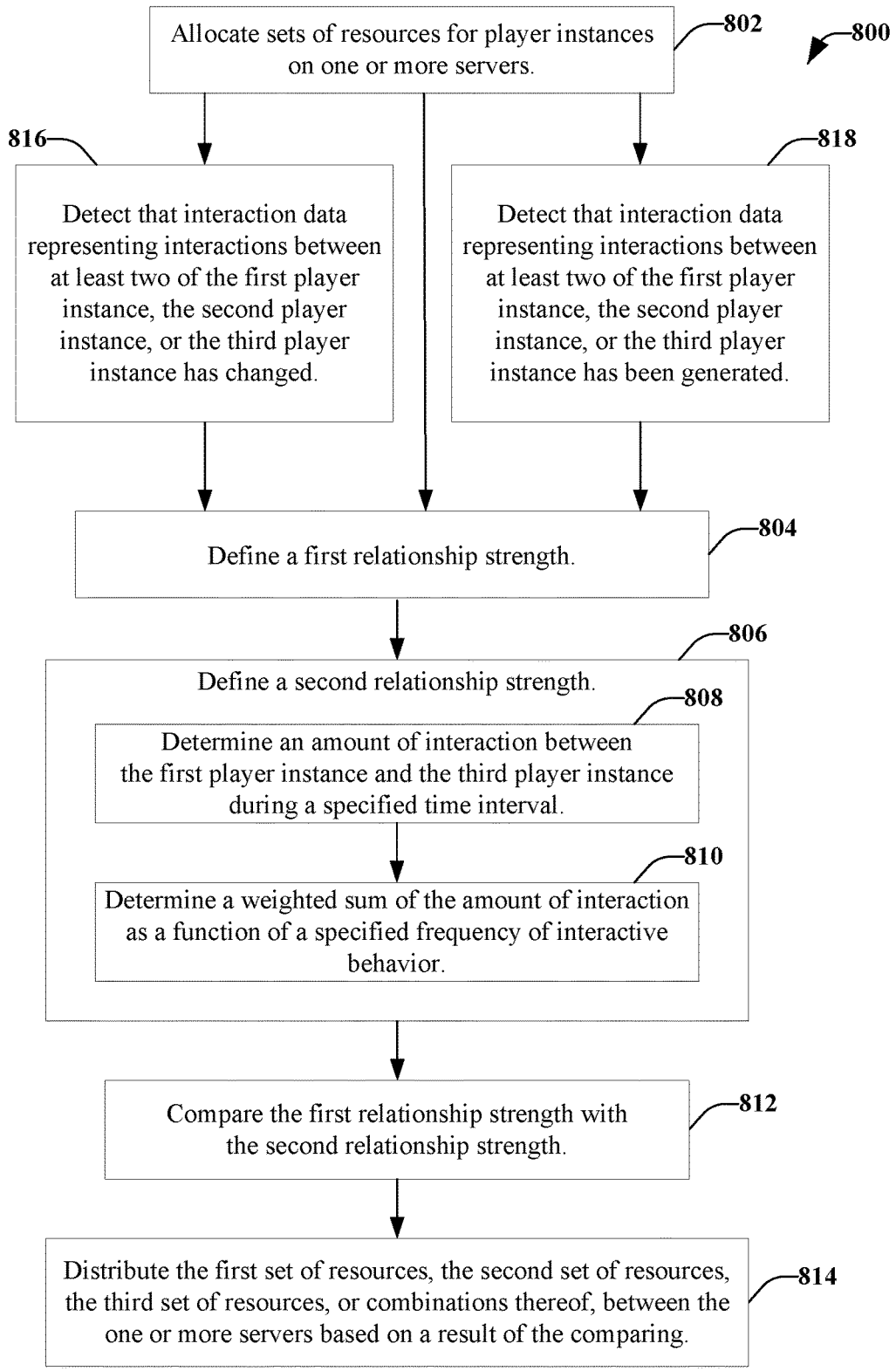
FIG. 8 is a flow diagram illustrating an example, non-limiting embodiment of another method for defining relationship strengths for resource management.

FIG. 8 is a flow diagram illustrating an example, non-limiting embodiment of another method 800 for defining relationship strengths during resource management. The flow diagram in FIG. 8 may be implemented using, for example, any of the systems, such as the system 400 (of FIG. 4), described herein.

Beginning at block 802, allocate sets of resources for player instances on one or more servers. Block 802 may be followed by block 804. At block 804, define a first relationship strength. In an implementation, the first relationship strength defines a capability used to process a first player instance and a second player instance on a first server. Block 804 may be followed by block 806.

At block 806, define a second relationship strength. The second relationship strength may define the capability used to process the first player instance and a third player instance on a second server.

According to an implementation, block 806 may include block 808 and block 810. At block 808, determine an amount of interaction between the first player instance and the third player instance during a specified time interval. Block 808 may be followed by block 810. At block 810, determine a weighted sum of the amount of interaction as a function of a specified frequency of interactive behavior.

Block 806 may be followed by block 812. At block 812, compare the first relationship strength with the second relationship strength. Block 812 may be followed by block 814. At block 814, distribute the first set of resources, the second set of resources, the third set of resources, or combinations thereof, between the one or more servers based on a result of the comparing.

According to an implementation, block 802 may be followed by block 816. At block 816, detect that interaction data representing interactions between at least two of the first player instance, the second player instance, or the third player instance has changed. When a change is detected, block 816 may be followed by block 804. The first relationship strength is defined, at block 804.

According to an alternative or additional implementation, block 802 may be followed by block 818. At block 818, detect that interaction data representing interactions between at least two of the first player instance, the second player instance, or the third player instance has been generated. When this interaction data has been created, block 818 may be followed by block 804. The first relationship strength is defined, at block 804.

Figure 9:
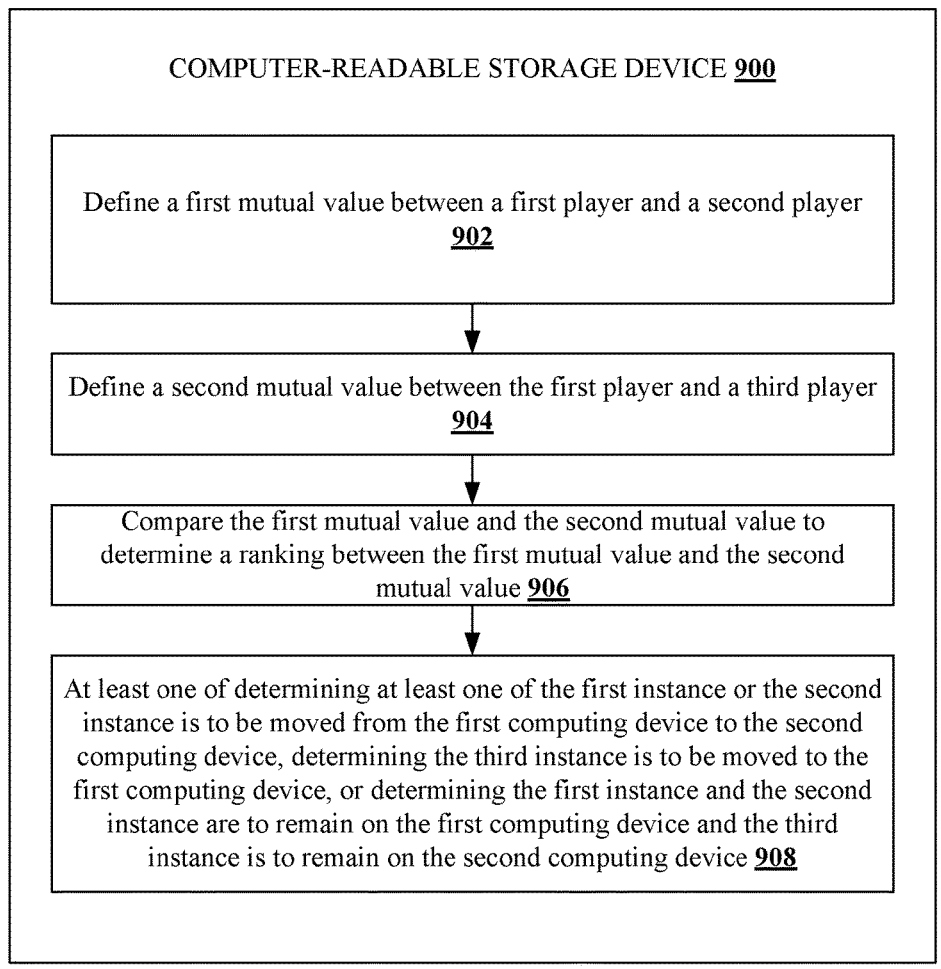
FIG. 9 illustrates a flow diagram of an example, non-limiting embodiment of a set of operations for server resource allocation for distributed games in accordance with at least some aspects of the subject disclosure.

FIG. 9 illustrates a flow diagram of an example, non-limiting embodiment of a set of operations for server resource allocation for distributed games in accordance with at least some aspects of the subject disclosure. Computer-readable storage device 900 may include computer executable instructions that, in response to execution, cause a system comprising a processor to perform operations.

At 902, these operations may cause the system to define a first mutual value between a first player and a second player. A first instance of the first player and a second instance of the second player may be allocated on a first computing device. At 904, the operations may cause the system to define a second mutual value between the first player and a third player. A third instance of the third player may be allocated on a second computing device.

At 906, the operations may cause the system to compare the first mutual value and the second mutual value to determine a ranking between the first mutual value and the second mutual value.

At 908, the operations may cause the system to determine that at least one of the first instance or the second instance is to be moved from the first computing device to the second computing device, to determine that the third instance is to be moved to the first computing device, or to determine that the first instance and the second instance are to remain on the first computing device and the third instance is to remain on the second computing device. For example, in order to determine that at least one of the first instance or the second instance is to be moved from the first computing device to the second computing device, the operations may cause the system to determine that the first mutual value is lower than the second mutual value. In another example, in order to determine that the third instance is to be moved to the first computing device, the operations may cause the system to determine that the first mutual value is higher than the second mutual value. In yet another example, in order to determine that the first instance and the second instance are to remain on the first computing device and the third instance is to remain on the second computing device, the operations may cause the system to determine that the first mutual value is equal to or substantially equal to the second mutual value.

In an implementation, the operations may cause the system to quantify interactions between the first player and the second player, and between the first player and the third player. In an example, the interactions may be quantified during one or more defined intervals.

According to another implementation, the operations may cause the system to monitor resources allocated on the first computing device and the second computing device and determine a set of the resources on the first computing device satisfy a resource level condition. Further to this implementation, the operations may cause the system to move at least one of the set of the resources from the first computing device to the second computing device.

In accordance with another implementation, the operations may cause the system to monitor resources allocated on the first computing device and the second computing device. Further, the operations may cause the system to determine that a set of the resources on the second computing device satisfy a resource level condition. In addition, the operations may cause the system to move at least one of the set of the resources from the second computing device to the first computing device.

As discussed herein, various non-limiting embodiments are directed to resource management for distributed computing games. The game resources may be dynamically allocated during the game process and changes to the running environment of the game may be dynamically altered. For example, the disclosed aspects are directed toward the game features and place emphasis on the load or on amount of interactions between two or more players.

Example Computing Environment

Figure 10:
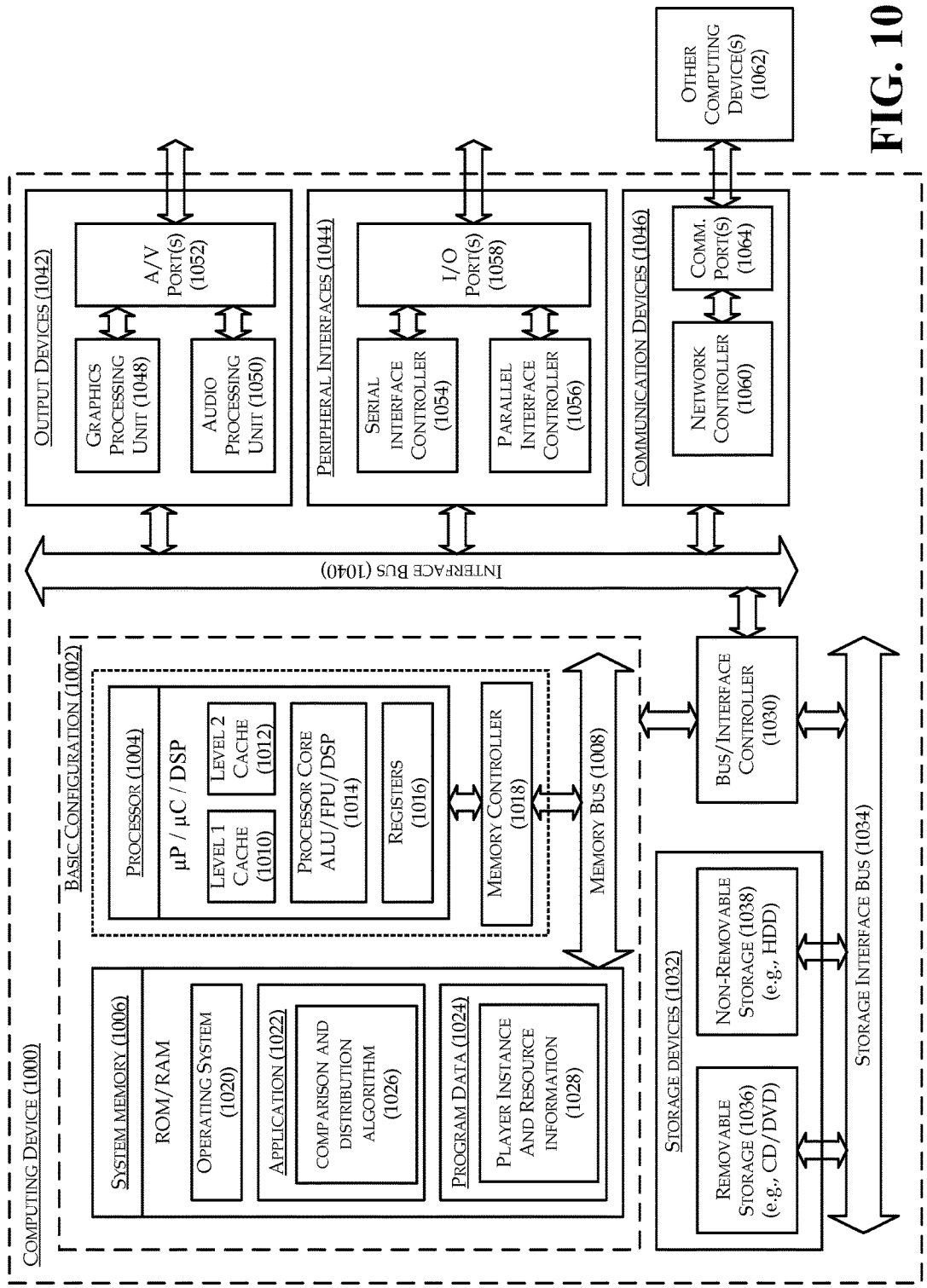
FIG. 10 is a block diagram illustrating an example computing device that is arranged for resource management for distributed games in accordance with at least some embodiments of the subject disclosure.

FIG. 10 is a block diagram illustrating an example computing device 1000 that is arranged for resource management for distributed games in accordance with at least some embodiments of the subject disclosure. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (μP), a microcontroller (μC), a digital signal processor (DSP), or any combination thereof. Processor 1004 may include one or more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP core), or any combination thereof. An example memory controller 1018 may also be used with processor 1004, or in some implementations, memory controller 1018 may be an internal part of processor 1004.

In an example, processor 1004 may execute or facilitate execution of the instructions to perform operations that include distributing player resources among a subset of computing devices and evaluating a first relationship strength between a first player and a second player, and a second relationship strength between the first player and a third player. The operations may also include evaluating other relationship strengths between other pairs of players. The operations may also include reallocating at least a subset of the player resources among the subset of computing devices.

According to an implementation, the operations may include calculating a first set of interactions between the first player and the second player during a defined time interval, and a second set of interactions between the first player and the third player during the defined time interval. Further to this implementation, the operations may include comparing the first set of interactions and the second set of interactions.

In accordance with some implementations, the operations may include transferring player resources associated with the first player from a first computing device of the subset of computing devices to another computing device of the subset of computing devices. The player resources may be transferred in response to a first value of the first set of interactions being determined to be less than a second value of the second set of interactions. According to other implementations, the operations may include transferring player resources associated with the third player from a first computing device of the subset of computing devices to another computing device of the subset of computing devices. These player resources may be transferred in response to a first value of the first set of interactions being determined to be more than a second value of the second set of interactions.

According to some implementations, the operations may include monitoring resources allocated among the subset of computing devices. The operations may also include determining resources of the player resources on a computing device of the subset of computing devices satisfies a resource level condition. The reallocating may comprise moving a player resource of the player resources from a first computing device of the subset of computing devices to another computing device of the subset of computing devices.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Applications 1022 may include a comparison and distribution algorithm 1026 that is arranged to perform the functions as described herein including those described with respect to the system 400 of FIG. 4. Program data 1024 may include player instance and resource information 1028 that may be useful for operation with comparison and distribution algorithm 1026 as is described herein. In some embodiments, applications 1022 may be arranged to operate with program data 1024 on operating system 1020 such that a resource management for distributed computing games may be provided. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036, and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., mouse, pen, voice input device, etc.) or other peripheral devices (e.g., printer, scanner, etc.) via one or more 1/0 ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (ID) and other wireless media. The term computer readable media as used herein may include both storage media and communication media.

The subject disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which may, of course, vary. It is also to be understood that the terminology used herein is for the purpose of describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost versus efficiency tradeoffs. There are various vehicles by which processes and/or systems and/or other technologies described herein may be effected (e.g., hardware, software, and/or firmware), and that the selected vehicle will vary with the context in which the processes and/or systems and/or other technologies are deployed. For example, if an implementer determines that speed and accuracy are paramount, the implementer may select a mainly hardware and/or firmware vehicle; if flexibility is paramount, the implementer may select a mainly software implementation; or, yet again alternatively, the implementer may select some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Further, designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiments of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve a similar functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wireles sly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "observation monitor" described in relation to FIG. 4 is also a feature in the aspect as shown in FIG. 2, FIG. 3, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A system, comprising:
   an allocation manager that distributes player resources among devices, wherein the player resources are respectively associated with participants of an interactive computing game;
   an observation monitor that detects a change to a first group of interaction data established between at least two participants of the participants or detects a formation of a second group of interaction data between the at least two participants; and
   a relationship supervisor that evaluates relationship strengths between groups of the participants, wherein the relationship strengths are used by the allocation manager to selectively redistribute the player resources among the devices.

2. The system of claim 1, wherein the relationship supervisor evaluates a first relationship strength, of the relationship strengths, defined for a first participant of the participants and a second participant of the participants, and evaluates a second relationship strength, of the relationship strengths, defined for the first participant and a third participant of the participants, and wherein second player resources, of the player resources, of the second participant and third player resources, of the player resources, of the third participant are distributed among different devices of the devices.

3. The system of claim 2, wherein first player resources, of the player resources, of the first participant and the second player resources of the second participant are stored on a first device of the devices and the third player resources of the third participant are stored on a second device of the devices, and wherein the allocation manager moves the first player resources of the first participant from the first device to the second device in response to a first value of the first relationship strength being determined to be less than a second value of the second relationship strength.

4. The system of claim 2, wherein first player resources, of the player resources, of the first participant and the second player resources of the second participant are stored on a first device of the devices and the third player resources of the third participant are stored on a second device of the devices, and wherein the allocation manager stores the first player resources of the first participant on the first device in response to a first value of the first relationship strength being determined to be greater than a second value of the second relationship strength.

5. The system of claim 1, wherein the relationship supervisor counts a number of interactions between the groups of the participants and determines a weighted sum of the number of interactions as a function of a predicted frequency of interactions between the groups of the participants.

6. The system of claim 1, further comprising a resource evaluator that monitors a player resource of the player resources allocated to the devices and determines whether the player resource of the player resources of a device of the devices satisfy a rule related to a resource level condition.

7. The system of claim 6, wherein the allocation manager moves a player resource of the player resources from the device to another device of the devices in response to the device being determined to satisfy the rule related to the resource level condition.

8. The system of claim 6, wherein the allocation manager moves a group of the player resources from the device to another device of the devices in response to the device being determined to satisfy the rule related to the resource level condition.

9. A non-transitory machine-readable storage medium, comprising executable instructions that, in response to execution by a system comprising a processor, facilitate performance of operations, comprising:
receiving information about a distribution of player resources among devices, wherein the player resources are respectively associated with participants of an interactive computing game;
in response to monitoring interactions of the participants, receiving an indication of a change, wherein the indication of the change is based on a first set of interaction data established between at least two participants of the participants or based on a formation of a second set of interaction data between the at least two participants; and
initiating redistribution of the player resources among the devices based on determining relationship strengths between subsets of the participants.

10. The non-transitory machine-readable storage medium of claim 9, wherein the relationship strengths comprise a first relationship strength defined for a first participant, of the participants, associated with first player resources of the player resources and a second participant, of the participants, associated with second player resources of the player resources, and a second relationship strength defined for the first participant and a third participant, of the participants, associated with third player resources of the player resources, and wherein the second player resources and the third player resources are distributed among different devices of the devices.

11. The non-transitory machine-readable storage medium of claim 10, wherein the first player resources and the second player resources are stored on a first device of the devices and the third player resources are stored on a second device of the devices, and wherein the initiating the redistribution of the player resources comprises moving the first player resources from the first device to the second device in response to a first value of the first relationship strength being determined to be less than a second value of the second relationship strength.

12. The non-transitory machine-readable storage medium of claim 10, wherein the first player resources and the second player resources are stored on a first device of the devices and the third player resources are stored on a second device of the devices, and wherein the initiating the redistribution of the player resources comprises storing the first player resources on the first device in response to a first value of the first relationship strength being determined to be greater than a second value of the second relationship strength.

13. The non-transitory machine-readable storage medium of claim 9, wherein the determining the relationship strengths comprises counting a number of interactions between the subsets of the participants and determining a weighted sum of the number of interactions as a function of a predicted frequency of interactions between the subsets of the participants.

14. The non-transitory machine-readable storage medium of claim 9, wherein the operations further comprise receiving resource level information based on player resources of a device of the devices being determined to satisfy a rule related to a resource level condition.

15. The non-transitory machine-readable storage medium of claim 14, wherein the initiating the redistribution of the player resources comprises moving a player resource of the player resources from the device to another device of the devices, and wherein the initiating is further based on the device being determined to satisfy the rule related to the resource level condition.

16. The non-transitory machine-readable storage medium of claim 14, wherein the initiating the redistribution of the player resources comprises moving a player resource of the player resources from the device to another device of the devices, and wherein the initiating is further based on the other device being determined to satisfy the rule related to the resource level condition.

17. A method, comprising:
receiving, by a system comprising a processor, information about a distribution of player resources distributed among computing devices, wherein the player resources are respectively associated with participants of an interactive computing game;
in response to monitoring interactions of the participants, receiving, by the system, a first indication of a change in a first interaction data established between a pair of the participants or a second indication of a change related to formation of second interaction data between the pair; and
enabling, by the system, redistribution of the player resources among the computing devices based on determining relationship strengths between groups of the participants.

18. The method of claim 17, wherein the determining the relationship strengths comprises evaluating a first relationship strength defined for a first participant of the participants and a second participant of the participants, and evaluating a second relationship strength defined for the first participant and a third participant of the participants, and wherein second player resources, of the player resources, of the second participant and third player resources, of the player resources, of the third participant are distributed among different computing devices of the computing devices.

19. The method of claim 18, wherein first player resources, of the player resources, of the first participant and the second player resources of the second participant are stored on a first computing device of the computing devices and the third player resources of the third participant are stored on a second computing device of the computing devices, and wherein the enabling the redistribution comprises, triggering, in response to a first value of the first relationship strength being determined to be less than a second value of the second relationship strength, moving the first player resources of the first participant from the first computing device to the second computing device.

20. The method of claim 17, further comprising, receiving, by the system, resource level information based on determining that a portion of the player resources present on a computing device of the computing devices satisfies a rule related to a resource level condition.

* * * * *

UNITED STATES PATENT AND TRADEMARK OFFICE
CERTIFICATE OF CORRECTION

PATENT NO.         : 9,849,390 B2
APPLICATION NO.    : 15/367031
DATED              : December 26, 2017
INVENTOR(S)        : Zhao et al.

It is certified that error appears in the above-identified patent and that said Letters Patent is hereby corrected as shown below:

In the Specification

In Column 9, Line 56, delete "$M(p_1,p_2)=w_i, m_i(p_1,p_2)$" and insert --  --, therefor.

In Column 20, Line 54, delete "1/0 ports" and insert -- I/O ports --, therefor.

In Column 21, Line 4, delete "infrared (ID)" and insert -- infrared (IR) --, therefor.

In Column 22, Line 65, delete "wireles sly" and insert -- wirelessly --, therefor.

In the Claims

In Column 26, Line 48, in Claim 17, delete "between a pair of" and insert -- between at least two participants of --, therefor.

In Column 26, Line 51, in Claim 17, delete "the pair;" and insert -- the at least two participants; --, therefor.

Signed and Sealed this
Twentieth Day of March, 2018

Andrei Iancu
*Director of the United States Patent and Trademark Office*